United States Patent
Janakiraman

(10) Patent No.: US 8,396,841 B1
(45) Date of Patent: Mar. 12, 2013

(54) METHOD AND SYSTEM OF MULTI-LEVEL AND MULTI-MODE CLOUD-BASED DEDUPLICATION

(75) Inventor: Viswesvaran Janakiraman, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 120 days.

(21) Appl. No.: 12/956,720

(22) Filed: Nov. 30, 2010

(51) Int. Cl.
G06F 17/30 (2006.01)
G06F 7/00 (2006.01)

(52) U.S. Cl. ........................ 707/692; 707/802
(58) Field of Classification Search ............ 707/692
See application file for complete search history.

(56) References Cited

U.S. PATENT DOCUMENTS

| | | |
|---|---|---|
| 5,561,421 A | 10/1996 | Smith |
| 5,990,810 A | 11/1999 | Williams |
| 6,014,676 A | 1/2000 | McClain |
| 6,141,784 A | 10/2000 | Davis |
| 6,389,433 B1 | 5/2002 | Bolosky et al. |
| 6,513,051 B1 | 1/2003 | Bolosky et al. |
| 6,865,655 B1 | 3/2005 | Andersen |
| 6,920,537 B2 | 7/2005 | Ofek et al. |
| 6,983,365 B1 | 1/2006 | Douceur et al. |
| 7,055,008 B2 | 5/2006 | Niles et al. |
| 7,136,976 B2 | 11/2006 | Saika |
| 7,146,429 B2 | 12/2006 | Michel |
| 7,200,604 B2 | 4/2007 | Forman et al. |
| 7,213,158 B2 | 5/2007 | Bantz et al. |
| 7,257,104 B2 | 8/2007 | Shitama |
| 7,257,643 B2 | 8/2007 | Mathew |
| 7,310,644 B2 | 12/2007 | Adya et al. |
| 7,318,072 B2 | 1/2008 | Margolus |
| 7,359,920 B1 | 4/2008 | Rybicki et al. |
| 7,389,394 B1 | 6/2008 | Karr |
| 7,401,194 B2 | 7/2008 | Jewell |
| 7,409,523 B2 | 8/2008 | Pudipeddi |
| 7,424,514 B2 | 9/2008 | Noble et al. |
| 7,454,592 B1 | 11/2008 | Shah |
| 7,478,113 B1 | 1/2009 | De Spiegeleer et al. |
| 2001/0045962 A1 | 11/2001 | Lee |
| 2002/0107877 A1 | 8/2002 | Whiting et al. |
| 2002/0199100 A1 * | 12/2002 | Nenashev ............. 713/161 |
| 2004/0044707 A1 | 3/2004 | Richard |
| 2004/0143731 A1 | 7/2004 | Audebert et al. |
| 2005/0027766 A1 | 2/2005 | Ben |
| 2005/0198328 A1 | 9/2005 | Lee et al. |
| 2005/0204108 A1 | 9/2005 | Ofek |

(Continued)

OTHER PUBLICATIONS

U.S. Appl. No. 11/404,105 entitled Routing, filed Apr. 13, 2006.

(Continued)

*Primary Examiner* — Kuen Lu

(74) *Attorney, Agent, or Firm* — Rory D. Rankin; Meyertons, Hood, Kivlin, Kowert & Goetzel, P.C.

(57) ABSTRACT

A system, method, and medium for performing multi-level and multi-mode deduplication in a cloud based backup storage system. Fingerprints are generated for data segments from individual clients at a first level, with a separate fingerprint index for each individual client. The fingerprints are compared to their respective fingerprint indexes, and if the fingerprints are unique, then their associated data segments may be deduplicated across data segments from a plurality of clients at a second level. The fingerprints are compared to a common fingerprint index and deduplicated at a second level. The common fingerprint index contains fingerprints generated from data segments from a plurality of clients connected to the backup storage system.

17 Claims, 6 Drawing Sheets

U.S. PATENT DOCUMENTS

| | | |
|---|---|---|
| 2005/0216813 A1 | 9/2005 | Cutts et al. |
| 2006/0026219 A1 | 2/2006 | Orenstein et al. |
| 2007/0198659 A1 | 8/2007 | Lam |
| 2007/0250674 A1 | 10/2007 | Fineberg et al. |
| 2008/0133561 A1 | 6/2008 | Dubnicki et al. |
| 2008/0154989 A1 | 6/2008 | Arman |
| 2008/0243769 A1 | 10/2008 | Arbour et al. |
| 2008/0243953 A1 | 10/2008 | Wu et al. |
| 2008/0244204 A1 | 10/2008 | Cremelie et al. |
| 2009/0182789 A1* | 7/2009 | Sandorfi et al. ............... 707/204 |
| 2010/0257403 A1 | 10/2010 | Virk et al. |
| 2010/0274982 A1 | 10/2010 | Mehr et al. |
| 2011/0191305 A1* | 8/2011 | Nakamura et al. ............ 707/692 |

OTHER PUBLICATIONS

U.S. Appl. No. 11/403,379 entitled Parallel Backup, filed Apr. 13, 2006.

U.S. Appl. No. 11/641,389, filed Dec. 18, 2006 entitled "Single Instance Storage".

* cited by examiner

| Client-Specific Fingerprint Index 510 ||
|---|---|
| Fingerprint Identification (ID) | Container ID in Storage |
| 1 | 1 |
| 2 | 2 |
| 3 | 3 |

*FIG. 5a*

| Common Fingerprint Index 520 ||
|---|---|
| Fingerprint ID | Container ID in Storage |
| 4 | 1 |
| 5 | 2 |
| 6 | 3 |

*FIG. 5b*

| Client-Specific Fingerprint Index 530 ||
|---|---|
| Fingerprint ID | Common Fingerprint ID |
| 1 | 4 |
| 2 | 5 |
| 3 | 6 |

*FIG. 5c*

METHOD AND SYSTEM OF MULTI-LEVEL AND MULTI-MODE CLOUD-BASED DEDUPLICATION

BACKGROUND OF THE INVENTION

1. Field of the Invention

The present invention relates generally to deduplication storage systems, and in particular to a method and system for storing backup data from multiple clients in a multi-level and multi-mode cloud-based deduplication storage system.

2. Description of the Related Art

Storage systems often receive backup data from multiple clients. For example, a cloud-based backup storage system may receive backup data from multiple independent clients. Each customer may wish to keep their individual data separate from other customers' data for security reasons. This may complicate the ability of the storage provider to optimize the storage of data. For example, the backup storage system may employ a deduplication scheme to reduce storage utilization. However, if data from individual clients is isolated from other clients' data, the storage system may store duplicate data across different clients, increasing the storage requirements of the backup storage system. Therefore, a need exists in the art for a deduplication scheme to maintain data security and maximize storage utilization in a multi-tenanted backup storage system.

In view of the above, improved methods and mechanisms for efficiently managing a deduplication storage system are desired.

SUMMARY OF THE INVENTION

Various embodiments of methods and mechanisms for performing deduplication in a backup storage system are contemplated. In one embodiment, a first fingerprint may be generated from a first data segment from a first client. In various embodiments, the first fingerprint may be generated at the first client or at a media server. The first fingerprint may be compared to a first fingerprint index to determine if the first fingerprint is unique or if an identical fingerprint already exists in the first fingerprint index. In response to determining the first fingerprint is unique, a new entry for the first fingerprint may be created in the first fingerprint index and the first data segment may be stored in a container in a backup storage device. Then, deduplication may be performed at a second level against a larger collection of fingerprints.

To perform deduplication at a second level, the first fingerprint may be compared to a second fingerprint index. Alternatively, a new fingerprint may be generated from the first data segment and compared to the second fingerprint index. In response to determining the second fingerprint index does not contain a matching fingerprint to the first fingerprint, a new entry for the first fingerprint may be created in the second fingerprint index.

Also, a second fingerprint may be generated from a second data segment from a second client. The second fingerprint may be compared to a third fingerprint index to determine if the second fingerprint is unique or if an identical fingerprint already exists in the third fingerprint index. The third fingerprint index may be different than the first fingerprint index.

In response to determining that the second fingerprint is unique, a new entry for the second fingerprint may be created in the third fingerprint index and the second data segment may be stored in a container in a backup storage device. Then, the second data segment may be deduplicated at a second level by comparing the second fingerprint to the second fingerprint index. In response to determining the second fingerprint index does not contain a matching fingerprint to the second fingerprint, a new entry for the second fingerprint may be created in the second fingerprint index.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 5a illustrates one embodiment of a client-specific fingerprint index.

FIG. 5b illustrates one embodiment of a common fingerprint index.

FIG. 5c illustrates another embodiment of a client-specific fingerprint index.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein.

Figure 1:
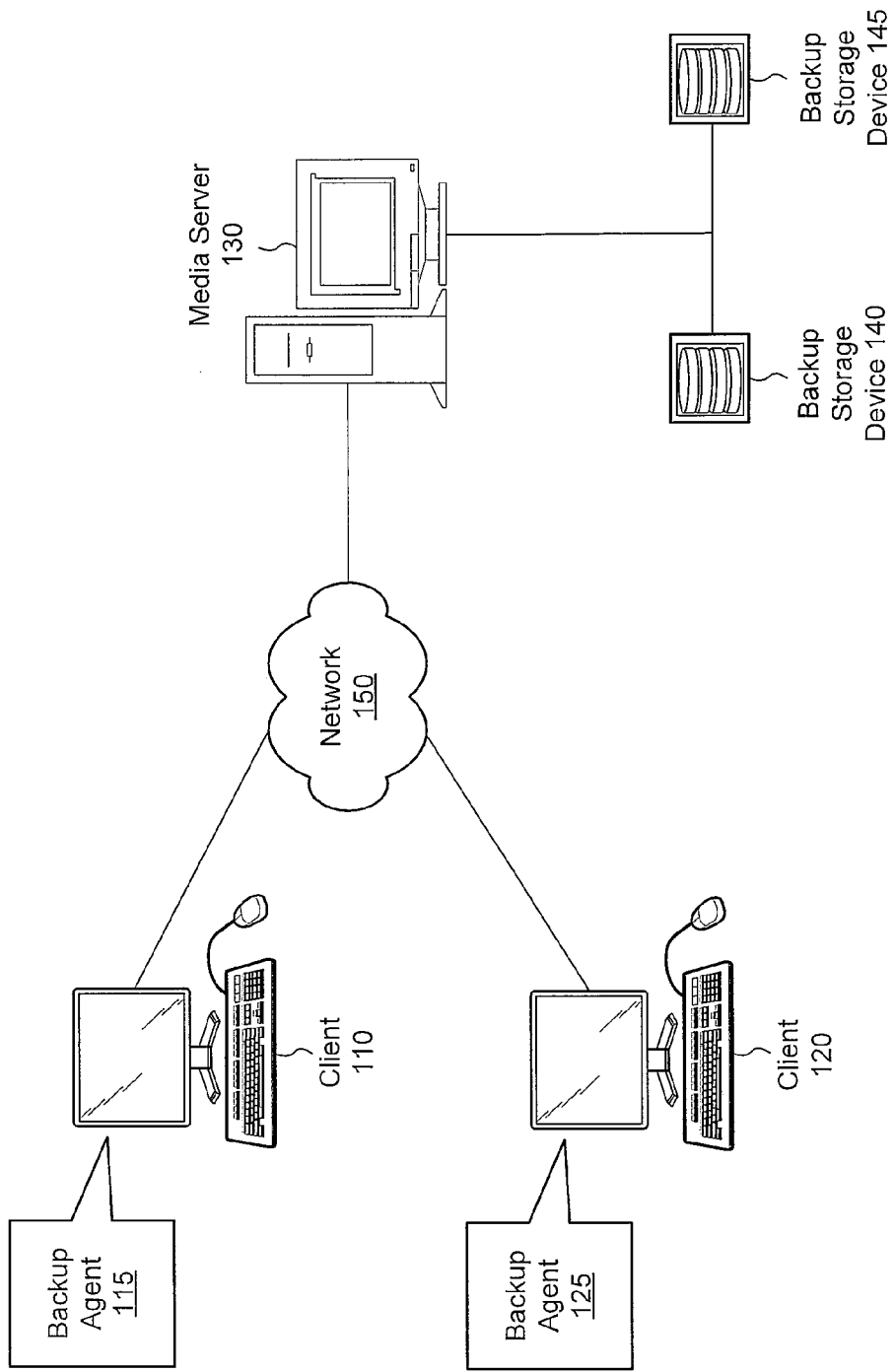
FIG. 1 is a diagram that illustrates a cloud-based deduplication backup storage system architecture in accordance with one or more embodiments.

Referring to FIG. 1, a generalized block diagram of one embodiment of a cloud-based deduplication backup storage system architecture is shown. Media server 130, client 110, and client 120 are connected to network 150. Network 150 may comprise a variety of network connections including combinations of local area networks (LANs), such as Ethernet networks, Fiber Distributed Data Interface (FDDI) networks, token ring networks, and wireless local area networks (WLANs) based on the Institute of Electrical and Electronics Engineers (IEEE) 802.11 standards (Wi-Fi), and wide area networks (WANs), such as the Internet, cellular data networks, and other data communication networks. Other network connections and architectures are possible and contemplated.

Media server 130 may be the controller of a cloud-based deduplication backup storage system. Media server 130 may manage backup storage devices 140 and 145, and media server 130 may maintain metadata associated with backup data received from clients 110 and 120. Metadata may be stored in the physical memory of media server 130. Alternatively, metadata may be stored on a storage device connected to media server 130, such as backup storage devices 140 and/or 145. Media server 130 may identify metadata according to the client to which it is associated, and it may keep a separate store of metadata for each individual client.

Media server 130 may host software to perform tasks associated with backing up and restoring data to clients 110 and 120. Media server 130 may also host software to perform tasks associated with deduplicating data received from clients 110 and 120. Media server 130 may perform deduplication at multiple levels instead of just performing deduplication a single time. First, media server 130 may deduplicate data from each client against data from only that specific client at a first level. Then, media server 130 may deduplicate data from each client against data from a plurality of clients at a second level. Media server 130 may implement in-line deduplication at the first level and post-processing deduplication at the second level. Media server 130 may consist of a client-facing instance for each client connected to media server 130. All of the client-facing instances may then be connected to a common backend layer that connects to backup storage media (i.e., backup storage devices 140 and 145).

To perform deduplication, backup data from clients 110 and 120 may be partitioned into data segments. Then, fingerprints may be generated from the data segments. Fingerprints may be used to uniquely identify data segments, and fingerprints are typically of much smaller size than data segments. Any of a variety of methods or techniques (e.g., hash, MD-5, SHA-1) may be used to generate a fingerprint from a data segment. After generating a fingerprint, media server 130 may search a fingerprint index for a matching fingerprint. If a match is found, then the new data segment may be deleted and a reference to the identical data segment already in storage may be put in its place. If a match is not found after searching the fingerprint index, then the new data segment may be stored in backup storage device 140 or 145 and the fingerprint may be added to the fingerprint index. In one embodiment, media server 130 may maintain a reference list to keep track of how many redundant data segments are referencing each data segment in storage. In another embodiment, media server 130 may keep a reference count for each data segment in storage, and it may increment the reference count for a specific data segment when it is referenced by a redundant data segment.

Media server 130 may create a separate fingerprint index for each different client. These separate fingerprint indexes may be used to provide a mapping of fingerprints to data segments and to perform deduplication at a first level. Media server 130 may also create a common fingerprint index to store fingerprints associated with all of the data segments stored in backup storage devices 140 and 145. The common fingerprint index may be used to provide a mapping of fingerprints to data segments and to perform deduplication at a second level.

In one embodiment, a master server or other type of server may perform the functions described herein as being performed by media server 130. In another embodiment, a content router may perform the functions described herein as being performed by media server 130. Media server 130 is representative of any number of media servers, master servers, content routers, or other types of servers which may be connected to network 150.

Media server 130 may be configured to store backup data in backup storage devices 140 and 145. Media server 130 may be directly connected to backup storage devices 140 and 145 or connected over any of a variety of networks, such as a LAN, storage area network (SAN), or other network. In one embodiment, backup storage devices 140 and 145 may be adapter cards directly attached to a bus of media server 130. Media server 130 may use internal memory (e.g., random-access memory (RAM)) for buffering data when receiving and sending data to and from clients 110 and 120, backup storage devices 140 and 145, or other devices. Backup storage devices 140 and 145 are representative of any number of backup storage devices, and may comprise any of a variety of types of storage media, such as a hard disk drive, disk volume, optical drive, tape drive, tape volume, robotic tape library, or other storage medium.

Clients 110 and 120 may communicate with media server 130 to backup and restore data. The data may take the form of a data set, a group of files, an image, a snapshot, a group of directories, database, volume, file system, or other structure of data. Clients 110 and 120 are representative of any number of stationary or mobile computers such as servers, desktop PCs, laptops, handheld computers, smartphones, or other computing devices. Client 110 may host backup agent 115 and client 120 may host backup agent 125 to assist with backup and restore operations; backup agents 115 and 125 may be software applications that run locally on clients 110 and 120, respectively, and communicate with media server 130 over network 150. Backup agents 115 and 125 may assist media server 130 in performing backups and deduplicating data on clients 110 and 120, respectively.

Data from clients 110 and 120 may be deduplicated at a first level using an inline process. For example, client 110 may have data that needs to be backed up. Client 110 may partition the data into segments, and then client 110 may generate fingerprints for the segments. Client 110 may begin by sending a single fingerprint to media server 130, and media server 130 may query a fingerprint index to determine if the fingerprint is already in the fingerprint index. The fingerprint index may be an index assigned only to client 110. If the fingerprint is already in the index, media server 130 may inform client 110 not to send the data segment. Media server 130 may then update metadata associated with client 110 to reference the identical fingerprint in the fingerprint index for that particular data segment. If the fingerprint is not in the index, media server 130 may request the data segment from client 110, client 110 may send the data segment to media server 130, and then media server 130 may store the data segment in backup storage device 140 or 145 and store the fingerprint in a new entry in the fingerprint index.

After media server 130 has received the data segment from client 110, media server may then deduplicate the data segment against a second collection of data segments. The second collection of data segments may include data segments from a plurality of clients. The second collection of data segments may also have an associated fingerprint index to maintain fingerprints that correspond to the second collection of data segments. Media server 130 may use the fingerprint generated at the first level or create a second fingerprint for the data segment at the second level; this second fingerprint may be generated using a different fingerprint generation method than the method used to generate the first fingerprint of the data segment.

After a data set has been backed up, client 110 or client 120 may wish to restore one or more data items from the backed up data set. For example, client 110 may request one or more data items (e.g. files, emails, images) or an entire backup image from media server 130. In response, media server 130 may retrieve from the metadata a mapping of the data segments that correspond to the requested data items. The metadata may include a data segment to fingerprint mapping, or media server 130 may create a data segment to fingerprint mapping as needed. Media server 130 may use the mapping to identify a fingerprint associated with each data segment. Then, media server 130 may search the fingerprint index associated with client 110 to locate the fingerprint entry containing the identified fingerprint.

In one embodiment, the retrieved entry in the first fingerprint index may include an identification (ID) of the container in which the requested data item is stored. A container may be a large file, and backup storage devices 140 and 145 may be organized into containers. In another embodiment, the entry in the first fingerprint index may contain a second fingerprint; the second fingerprint may be associated with the requested data item at the second level of deduplication. Media server 130 may then search the second fingerprint index for the entry containing the second fingerprint. After finding the entry with the second fingerprint, media server 130 may retrieve a container ID from the entry. Media server 130 may locate and retrieve the requested data item using the container ID, and then media server 130 may send the requested data item to client 110.

The media server and clients of FIG. 1 may comprise various hardware and software components. The hardware components may include one or more processors, memory devices, and input/output (I/O) devices, connected together via a bus architecture. The software components may include an operating system stored in a memory device. The operating system may be any of various types of operating systems, such as Microsoft Windows®, Linux®, Solaris®, or others. The operating system may be operable to provide various services to the user and may support the execution of various programs such as backup applications, server applications, deduplication engines, client-facing instances, backend layers, software agents, or any of a variety of other applications.

In other embodiments, the number and type of clients, servers, networks, and backup storage devices is not limited to those shown in FIG. 1. Any number and combination of servers, desktops, laptops, and mobile clients may be interconnected in network architectures via various combinations of modem banks, direct LAN connections, wireless connections, WAN links, etc. Also, at various times one or more clients and servers may operate offline. In addition, during operation, individual client and server connection types may change as mobile users travel from place to place connecting, disconnecting, and reconnecting to network 150.

Figure 2:
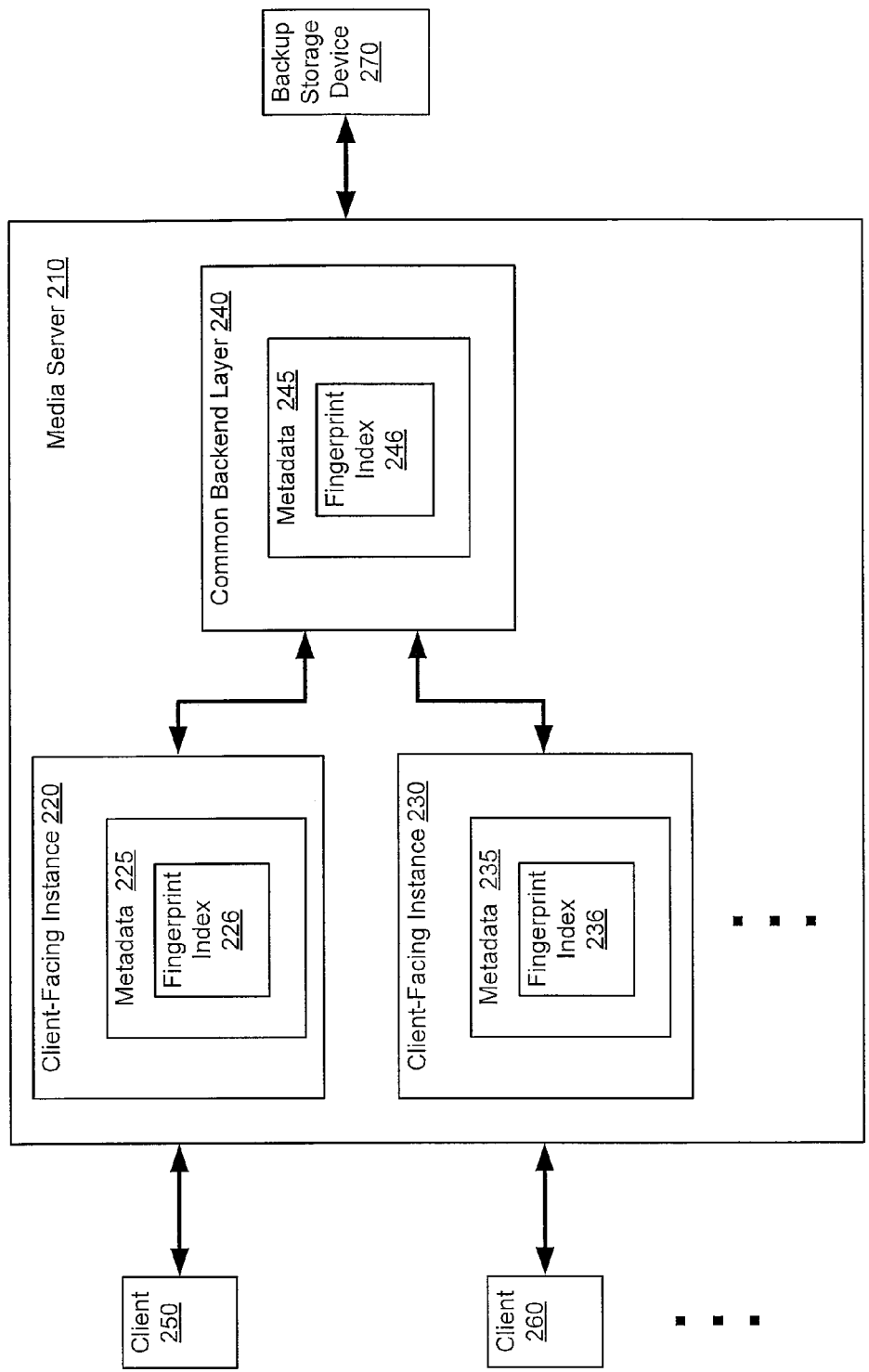
FIG. 2 illustrates a media server in accordance with one or more embodiments.

Referring now to FIG. 2, one embodiment of a media server is shown. Media server 210 is comprised of client-facing instances 220 and 230 and common backend layer 240. Client-facing instances 220 and 230 may be software applications, processes, or threads within a multi-threaded software application. Client-facing instances 220 and 230 are representative of any number of client-facing instances which may be implemented as part of media server 210. For each client that connects to media server 210 to backup data, there may be a unique client-facing instance that interfaces to only that client. For example, if there are 100 clients connected to media server 210, there may be 100 client-facing instances in media server 210 to interface with the 100 clients.

In one embodiment, client-facing instances 220 and 230 may have their own memory space within the physical memory of media server 210 for storing data specific to their respective clients. In another embodiment, client-facing instances 220 and 230 may have storage allocated in a storage device external to media server 210 such as backup storage device 270. For example, data specific to client-facing instance 220 may be loaded into physical memory of media server 210 as needed for client-facing instance 220 to perform one or more functions associated with client 250. After the functions have been performed, the metadata specific to client-facing instance 220 may be moved to backup storage device 270 to create space for metadata specific to other client-facing instances.

Client-facing instance 220 may comprise one or more software applications. Client-facing instance 220 may also store metadata 225, and metadata 225 may comprise fingerprint index 226. Client-facing instance 220 may communicate with client 250 to deduplicate data segments client 250 wants to backup. Client 250 may partition data into segments, and then create fingerprints for each of the segments. Client 250 may send each fingerprint to client-facing instance 220, and client-facing instance 220 may search fingerprint index 226 to determine if the fingerprint is unique. If client-facing instance 220 finds an identical fingerprint in the index, then client-facing instance 220 may discard the new fingerprint and inform client 250 that it does not need to send the data segment associated with the new fingerprint. Client-facing instance 220 may also store a reference in metadata 225; the reference may point to the identical fingerprint in fingerprint index 226. Metadata 225 may include a reference list to keep track of how many redundant data segments reference each identical data segment in storage. Metadata 225 may also include additional information.

If client-facing instance 220 determines that the new fingerprint is not in fingerprint index 226, then client-facing instance 220 may add an entry with the new fingerprint to fingerprint index 226. Client-facing instance 220 may also add a link between the original data segment and its associated new fingerprint in metadata 225. Client-facing instance 220 may request the data segment from client 250, and then client 250 may send the data segment to client-facing instance 220. In one embodiment, client 250 may send the original data segment. In another embodiment, client 250 may encrypt the data segment before sending it to client-facing instance 220. In a further embodiment, client 250 may compress the data segment before sending it to client-facing instance 220. In a still further embodiment, client 250 may compress and encrypt the data segment before sending it to client-facing instance 220. Client 250 may use any of a variety of compression and encryption techniques to compress and/or encrypt data.

If client 250 encrypts the data segment, client 250 may also pass an encryption key to client-facing instance 220. Client-facing instance 220 may use the encryption key to decrypt the data segment. Client-facing instance 220 may then store the decrypted data segment in backup storage device 270. Alternatively, client 250 may not send an encryption key to client-facing instance 220. In that case, client-facing instance 220 may store the decrypted data segment in backup storage device 270 as an encrypted data segment. In one embodiment, client 250 may update the encryption key and pass the updated encryption key to client-facing instance 220. Client-facing instance 220 may store the original encryption key and one or more updated encryption keys in metadata 225.

If client 250 compresses the data segment before sending it to client-facing instance 220, then client-facing instance 220 may decompress the data segment before storing it in backup storage device 270. Client 250 may inform client-facing instance 220 of the type of compression being used so that client-facing instance 220 can properly process the data.

In some embodiments, client-facing instance 220 may receive a backup image, snapshot, set of files, or other complete data set from client 250. Client-facing instance 220 may partition the data into data segments, and then deduplicate the data segments as described above.

Client-facing instance 230 may include metadata 235; metadata 235 may comprise fingerprint index 236. Client-facing instance 230 may connect to client 260 and deduplicate and store data for only client 260. Client-facing instance 230 may perform the same or similar functions to those described above as being performed by client-facing instance 220.

Each client-facing instance may provide any specific services that are required for its respective client. For example, client-facing instance 220 may receive encrypted data from client 250, while client-facing instance 230 may receive unencypted data from client 260. Likewise, a plurality of client-facing instances may adopt any parameters and operating conditions that are requested or needed by their respective clients, and each of the plurality of client-facing instances may be independent of each other.

Common backend layer 240 may deduplicate data segments at a second level. The data segments may have already been deduplicated at a first level against other data segments from the same client. Common backend layer 240 may include a tracking mechanism to detect changes to backup storage device 270. After detecting changes, common backend layer 240 may query fingerprint indexes 226 and 236 for the fingerprints associated with the new data segments stored in backup storage device 270. Common backend layer 240 may include metadata 245, and metadata 245 may comprise fingerprint index 246. Fingerprint index 246 may be distinct from fingerprint indexes 226 and 236. The entries in fingerprint index 246 may contain fingerprints generated from data segments that originated from a plurality of clients; the plurality of clients may include clients 250 and 260. The fingerprints in fingerprint index 246 may be actual fingerprints or references to fingerprints in fingerprint indexes 226 and 236.

Client-facing instances 220 and 230 may operate as if they are clients of common backend layer 240. Common backend layer 240 may generate fingerprints for the data segments received by client-facing instances 220 and 230. Common backend layer 240 may use a different fingerprint generation method than was used by either client-facing instance 220 or 230. Alternatively, common backend layer 240 may reuse the same fingerprints that were generated by client-facing instances 220 and 230 and stored in fingerprint indexes 226 and 236, respectively. After generating a fingerprint for a data segment, or retrieving a fingerprint from fingerprint index 226 or 236, common backend layer 240 may search fingerprint index 246 for a matching fingerprint. If a matching fingerprint is found, common backend layer 240 may delete the data segment and store a reference to the matching identical fingerprint in metadata 245. Common backend layer 240 may also add an identification of the discarded data segment to the reference list of the matching fingerprint. If a matching fingerprint is not found, common backend layer 240 may add a new entry to fingerprint index 246 for the new fingerprint. In some embodiments, common backend layer 240 may store the data segment in a container in backup storage device 270. Then, common backend layer 240 may store the container ID in the new entry in fingerprint index 246 and in the corresponding entry in fingerprint index 226 or 236. The containers in backup storage device 270 may also contain indexes to indicate where data segments are stored within the containers. Backup storage device 270 is representative of any number of backup storage devices.

In one embodiment, common backend layer 240 may compress the data segment before storing it in backup storage device 270. In another embodiment, common backend layer 240 may combine one or more data segments together into a larger data segment, and then store the larger data segment in backup storage device 270. Common backend layer 240 may compress the larger data segment before storing it in backup storage device 270. In a further embodiment, common backend layer 240 may encrypt the data segment before storing it in backup storage device 270. Common backend layer 240 may also store an encryption key in metadata 245; the encryption key may be used to decrypt the data segment during a restore operation. Any combination of the above described embodiments may be used by common backend layer 240 in a single embodiment.

In some embodiments, client-facing instances 220 and 230 may store the data segments in backup storage device 270 after performing the first level of deduplication. Common backend layer 240 may perform a second level of deduplication in a post-processing operation. Common backend layer 240 may perform the post-processing deduplication as processing cycles become available, so as not to interfere with more time-critical operations (i.e., backup and restore operations).

Figure 3:
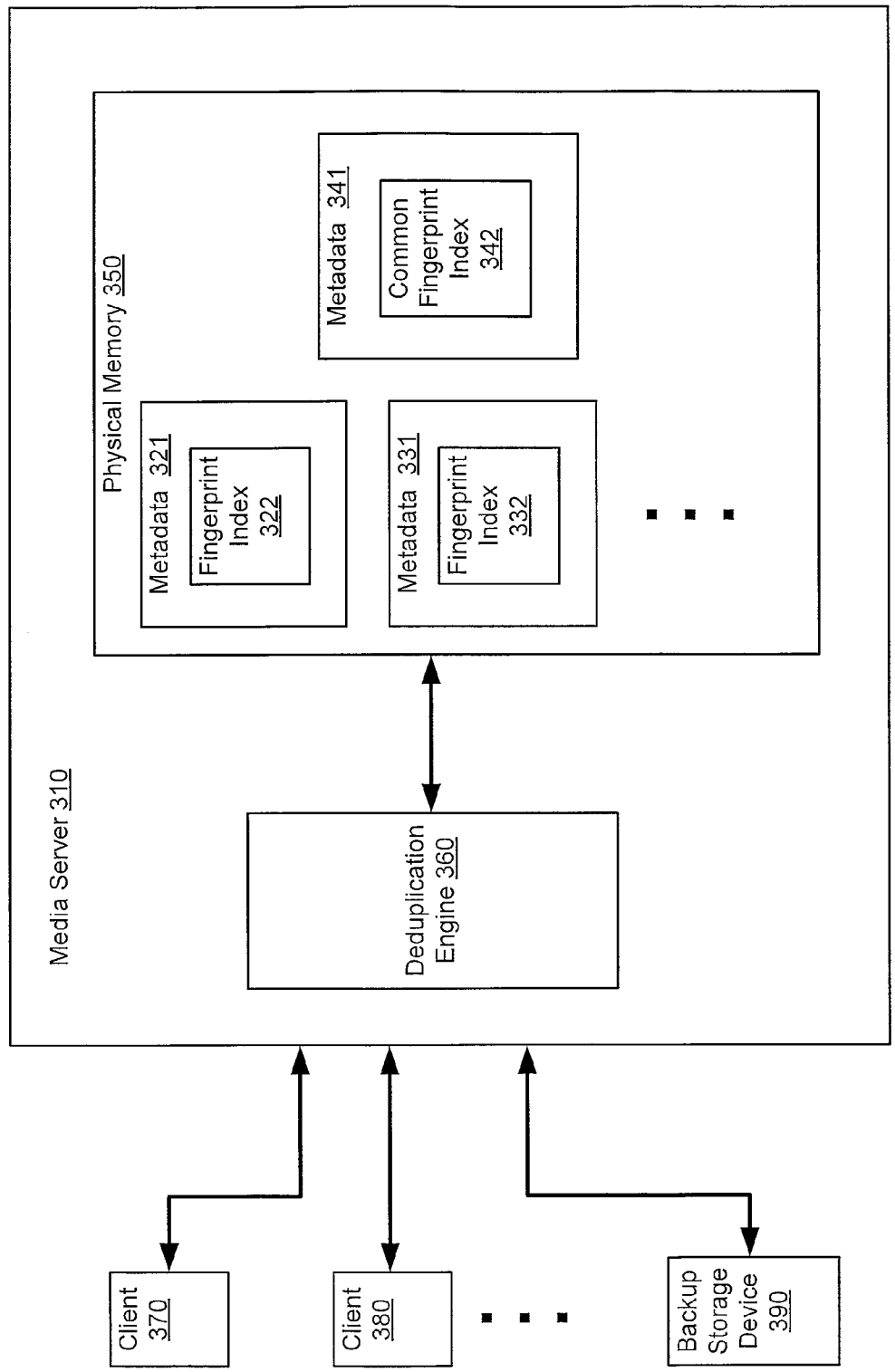
FIG. 3 illustrates a media server in accordance with one or more embodiments.

Referring now to FIG. 3, another embodiment of a media server that may be employed to implement the methods and mechanisms described herein is shown. Media server 310 may include deduplication engine 360 and physical memory 350. Clients 370 and 380 may be connected to media server 310 to store backup data. Clients 370 and 380 may be connected over a network or directly connected to media server 310. Clients 370 and 380 are representative of any number of clients which may be connected to media server 310. Backup storage device 390 may be connected to media server 310 for the storage of backup data, metadata, and other data. Backup storage device 390 is representative of any number of backup storage devices which may be connected to media server 310.

Metadata 321 may be stored in physical memory 350, and metadata 321 may include fingerprint index 322. Metadata 321 and fingerprint index 322 may contain metadata and fingerprints associated with client 370. Metadata 331 may also be stored in physical memory 350, and metadata 331 may include fingerprint index 332. Metadata 331 and fingerprint index 332 may contain metadata and fingerprints associated with client 380. There may be additional metadata stores and fingerprint indexes for each additional client connected to media server 310. Metadata 321 and fingerprint index 322 may be separate from metadata 331 and fingerprint index 332. In another embodiment, metadata 321 and metadata 331 may be stored in backup storage device 390 and moved to physical memory 350 individually on an as-needed basis.

Metadata 341 may also be stored in physical memory 350, and metadata 341 may include common fingerprint index 342. Common fingerprint index 342 may contain entries for fingerprints used during a second level of deduplication. The fingerprints may be the same fingerprints used during the first level of deduplication, or the fingerprints may be generated using a different method than the first level of deduplication. The entries in common fingerprint index 342 may contain fingerprints associated with data segments from a plurality of clients; the plurality of clients may include clients 370 and 380.

Deduplication engine 360 may be a software application or process running on media server 310. Deduplication engine 360 may receive fingerprints from clients 370 and 380 and perform deduplication at a first level using fingerprint index 322 for client 370 and fingerprint index 332 for client 380. If client 370 or 380 sends encrypted and/or compressed data segments to media server 310, deduplication engine 360 may perform decryption and/or decompression on the received data segments. Deduplication engine 360 may partition data into data segments if clients 370 and 380 send non-partitioned data to media server 310.

After deduplication engine 360 has deduplicated the data segments from clients 370 and 380 at a first level, deduplication engine 360 may then perform deduplication at a second level. Deduplication engine 360 may generate new fingerprints or reuse fingerprints for unique data segments that have not been discarded during the first level of deduplication. Deduplication engine 360 may compare each fingerprint to common fingerprint index 342. If a match is found, the corresponding data segment may be deleted and a reference to the matching identical fingerprint may be stored in metadata 341. If a match is not found, an entry for the fingerprint may be added to common fingerprint index 342. Deduplication engine 360 may store the container ID in the new entry and in the corresponding entry in fingerprint index 322 or 332.

In some embodiments, deduplication engine 360 may store the data segments in backup storage device 390 after the first level of deduplication. Then, deduplication engine 360 may perform the second level of deduplication at a time when processing cycles in media server 310 are available. Redundant data segments may be deleted from backup storage device 390 during the second level of deduplication. In one embodiment, deduplication engine 360 may update fingerprint indexes 322 and 332 to replace the reference to the deleted data segment with a reference to the identical data segment still in backup storage device 390. In another embodiment, the reference update operation may take place in common fingerprint index 342; the reference update operation may be transparent to fingerprint indexes 322 and 332.

Figure 4:
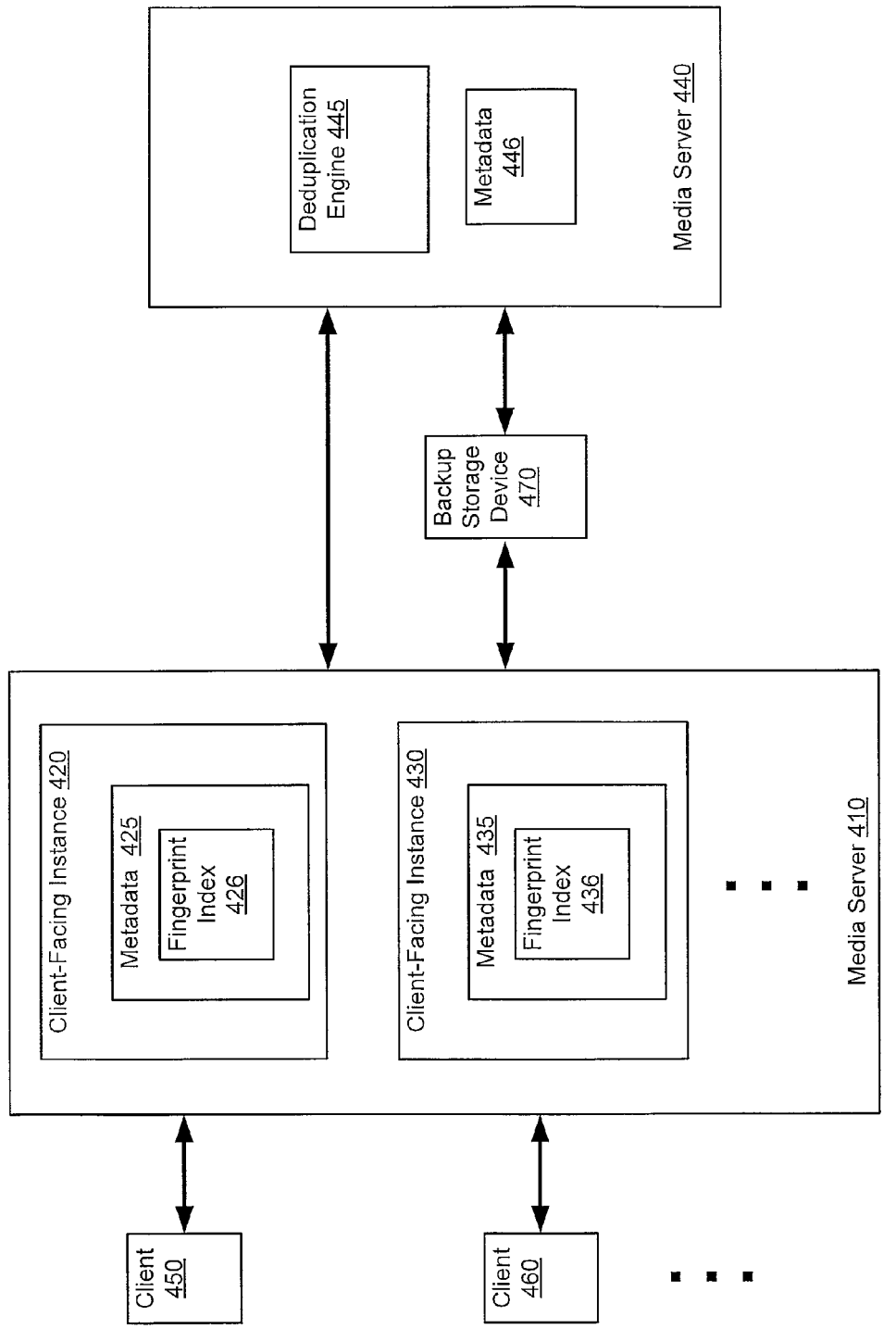
FIG. 4 illustrates a dual media server architecture in accordance with one or more embodiments.

Referring now to FIG. 4, one embodiment of a dual media server architecture is shown. Clients 450 and 460 may connect to media server 410 to backup data. Clients 450 and 460 are representative of any number of clients which may connect to media server 410. Clients 450 and 460 may connect to media server 410 over a network, such as the internet, or they may connect directly to media server 410. Media server may host client-facing instances 420 and 430; client-facing instances 420 and 430 may store metadata 425 and 435, respectively. Metadata 425 may include fingerprint index 426 and metadata 435 may include fingerprint index 436. Client-facing instance 420 may deduplicate data associated with only client 450 and client-facing instance 430 may deduplicate data associated with only client 460.

Client-facing instances 420 and 430 may deduplicate data at a first level and then store unique data segments in backup storage device 470. Media server 440 may include deduplication engine 445 and metadata 446. Deduplication engine 445 may deduplicate the data segments stored in backup storage device 470 by media server 410 (i.e., client-facing instances 420 and 430) at a second level. Metadata 446 may include a single, common fingerprint index. Deduplication engine 445 may use the single, common fingerprint index to deduplicate the data segments received from media server 410. Deduplication engine 445 may store unique data segments in backup storage device 470. Deduplication engine 445 may also perform encryption, decryption, compression, and decompression as previously described on an as-needed basis. Backup storage device 470 is representative of any number of backup storage devices which may be connected to media server 440.

Turning now to FIG. 5a, one embodiment of a client-specific fingerprint index is shown. Client-specific fingerprint index 510 contains three entries. FIG. 5a is for illustrative purposes only; in other embodiments, client-specific fingerprint index 510 may contain more than three entries. The three entries in index 510 are for fingerprint identifications (ID) 1-3. Fingerprint ID 1 corresponds to the fingerprint generated at a first level of deduplication for a first data segment. Fingerprint ID 2 corresponds to the fingerprint generated at a first level of deduplication for a second data segment. Fingerprint ID 3 corresponds to the fingerprint generated at a first level of deduplication for a third data segment. Each entry also contains a container ID indicating where the corresponding data segment is stored. The entries for fingerprint ID's 1-3 have corresponding container ID's 1-3.

Referring now to FIG. 5b, one embodiment of a common fingerprint index is shown. Common fingerprint index 520 contains three entries. The three entries in index 520 are for fingerprint identifications (ID) 4-6. Fingerprint ID 4 corresponds to the fingerprint generated at a second level of deduplication for a first data segment. The first data segment is the same data segment that corresponds to fingerprint ID 1 stored in the first entry of client-specific fingerprint index 510. Fingerprint ID 5 corresponds to the fingerprint generated at a second level of deduplication for a second data segment. Fingerprint ID 6 corresponds to the fingerprint generated at a second level of deduplication for a third data segment. Each entry also contains a container ID indicating where the corresponding data segment is stored. The entries for fingerprint ID's 4-6 have corresponding container ID's 1-3, which are the same for the three entries of client-specific fingerprint index 510. The three entries of index 510 and the three entries of index 520 correspond to the same three data segments.

Turning now to FIG. 5c, another embodiment of a client-specific fingerprint index that may be employed to implement the methods and mechanisms described herein is shown. Client-specific fingerprint index 530 contains three entries that correspond to the same three data segments as indexes 510 and 520. Client-specific fingerprint index 530 contains a fingerprint ID for each entry, and also a common fingerprint ID for each entry. Instead of including a container ID where the corresponding data segment is stored, index 530 contains an ID for the common fingerprint that was generated from the corresponding data segment. Index 530 may be used to determine the common fingerprint ID for a client-specific fingerprint, and then the common fingerprint ID may be used to find the entry and container ID for the corresponding data segment in index 520 so that the data segment can be located.

Figure 6:
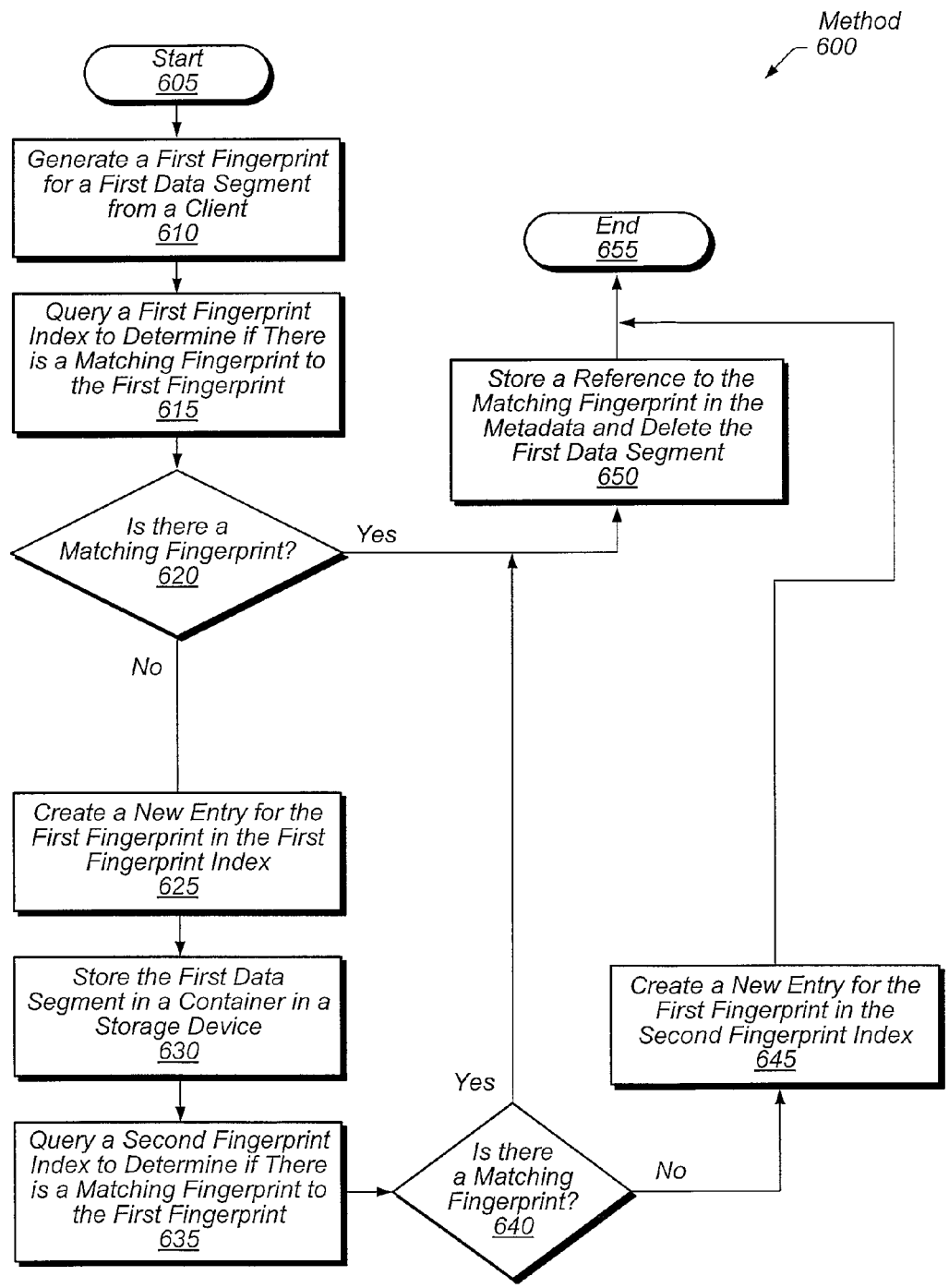
FIG. 6 is a generalized flow diagram illustrating one embodiment of a multi-level deduplication method.

Referring now to FIG. 6, one embodiment of a method for performing multi-level deduplication is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

Method 600 starts in block 605, and then a first fingerprint is generated for a first data segment from a client in block 610. The first fingerprint may be generated at the client or at a media server. Next, a first fingerprint index may be queried to determine if the first fingerprint index contains a matching fingerprint to the first fingerprint in block 615. If it is determined that there is not a matching fingerprint to the first fingerprint (conditional block 620), then a new entry for the first fingerprint may be created in the first fingerprint index (block 625). The new entry may also store a container ID of the container where the first data segment is stored. If it is determined that there is a matching fingerprint to the first fingerprint (conditional block 620), then a reference to the matching fingerprint may be stored in the metadata and the first data segment may be deleted (block 650). The first fingerprint may also be discarded after finding a matching fingerprint.

After block 625, the first data segment may be stored in a container in a storage device (block 630). Then, a second fingerprint index may be queried to determine if the second fingerprint index contains a matching fingerprint to the first fingerprint (block 635). If it is determined that the second fingerprint index does not contain a matching fingerprint to the first fingerprint (conditional block 640), then a new entry for the first fingerprint may be created in the second fingerprint index (block 645). After block 645, method 600 may end in block 655. If it is determined that the second fingerprint index contains a matching fingerprint to the first fingerprint (conditional block 640), then a reference to the matching fingerprint may be stored in the metadata and the first data segment may be deleted (block 650). After block 650, method 600 may end in block 655.

It is noted that the above-described embodiments may comprise software. In such an embodiment, program instructions and/or a database (both of which may be referred to as "instructions") that represent the described systems and/or methods may be stored on a computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, Flash memory, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A method for performing multi-level deduplication, the method comprising:
    maintaining a first fingerprint index configured to store fingerprints for data stored in a first client, a second fingerprint index configured to store fingerprints for data stored in a second client, and a common fingerprint index configured to store fingerprints for data stored in both the first client and the second client;
    generating a first fingerprint for a first data segment, wherein the first data segment corresponds to the first client;
    querying the first fingerprint index to determine if there is a matching fingerprint to the first fingerprint;
    in response to determining the first fingerprint index does not contain a matching fingerprint to the first fingerprint:
        creating a new entry for the first fingerprint in the first fingerprint index;
        storing the first data segment in a container in a storage device;
        querying the common fingerprint index to determine if there is a matching fingerprint to the first fingerprint;
        in response to determining the common fingerprint index does not contain a matching fingerprint to the first fingerprint, creating a new entry for the first fingerprint in the common fingerprint index;
        in response to determining the common fingerprint index contains a matching fingerprint to the first fingerprint:
            storing a reference to the matching fingerprint from the first fingerprint; and
            deleting the first data segment.

2. The method as recited in claim 1, further comprising:
    generating a second fingerprint for a second data segment, wherein the second data segment corresponds to the second client;
    querying the second fingerprint index to determine if there is a matching fingerprint to the second fingerprint;
    in response to determining the second fingerprint index does not contain a matching fingerprint to the second fingerprint:
        creating a new entry for the second fingerprint in the second fingerprint index;
        storing the second data segment in a container in a storage device;
        querying the common fingerprint index to determine if there is a matching fingerprint to the second fingerprint;
        in response to determining the common fingerprint index does not contain a matching fingerprint to the second fingerprint, creating a new entry for the second fingerprint in the common fingerprint index;
        in response to determining the common fingerprint index contains a matching fingerprint to the second fingerprint:
            storing a reference to the matching fingerprint from the second fingerprint; and
            deleting the second data segment.

3. The method as recited in claim 1, wherein the common fingerprint index is queried to determine if there is a matching fingerprint to a second fingerprint, and wherein the second fingerprint is generated from the first data segment.

4. The method as recited in claim 3, wherein a fingerprint generation technique used for the first fingerprint index is different from a fingerprint generation technique used for the common fingerprint index.

5. The method as recited in claim 3, further comprising:
    prior to sending the first data segment to a media server, encrypting the first data segment;
    receiving an encryption key at the media server; and
    prior to generating a third fingerprint from the first data segment, decrypting the first data segment using the encryption key.

6. The method as recited in claim 2, wherein the first fingerprint index is comprised of entries for fingerprints associated with data segments from only the first client, wherein the second fingerprint index is comprised of entries for fingerprints associated with data segments from only the second client, and wherein the common fingerprint index is comprised of entries for fingerprints associated with data segments from a plurality of clients, and wherein the plurality of clients includes the first and second clients.

7. A computer readable storage medium comprising program instructions to perform multi-level deduplication, wherein when executed the program instructions are operable to:
maintain a first fingerprint index configured to store fingerprints for data stored in a first client, a second fingerprint index configured to store fingerprints for data stored in a second client, and a common fingerprint index configured to store fingerprints for data stored in both the first client and the second client;
generate a first fingerprint for a first data segment from a first client;
query the first fingerprint index to determine if there is a matching fingerprint to the first fingerprint;
in response to determining the first fingerprint index does not contain a matching fingerprint to the first fingerprint:
create a new entry for the first fingerprint in the first fingerprint index;
store the first data segment in a container in a storage device;
query the second fingerprint index to determine if there is a matching fingerprint to the first fingerprint;
in response to determining the common fingerprint index does not contain a matching fingerprint to the first fingerprint, create a new entry for the first fingerprint in the common fingerprint index;
in response to determining the common fingerprint index contains a matching fingerprint to the first fingerprint:
store a reference to the matching fingerprint from the first fingerprint; and
delete the first data segment.

8. The computer readable storage medium as recited in claim 7, wherein when executed the program instructions are further operable to:
generate a second fingerprint for a second data segment from a second client;
query the second fingerprint index to determine if there is a matching fingerprint to the second fingerprint;
in response to determining the second fingerprint index does not contain a matching fingerprint to the second fingerprint:
create a new entry for the second fingerprint in the second fingerprint index;
store the second data segment in a container in a storage device;
query the common fingerprint index to determine if there is a matching fingerprint to the second fingerprint;
in response to determining the common fingerprint index does not contain a matching fingerprint to the second fingerprint, create a new entry for the second fingerprint in the common fingerprint index;
in response to determining the common fingerprint index contains a matching fingerprint to the second fingerprint:
store a reference to the matching fingerprint from the second fingerprint; and
delete the second data segment.

9. The computer readable storage medium as recited in claim 7, wherein the common fingerprint index is queried to determine if there is a matching fingerprint to a second fingerprint, and wherein the second fingerprint is generated from the first data segment.

10. The computer readable storage medium as recited in claim 9, wherein generating a first fingerprint from the first data segment involves using a first fingerprint generation technique, wherein generating a third fingerprint from the first data segment involves using a second fingerprint generation technique, and wherein the first fingerprint generation technique is different than the second fingerprint generation technique.

11. The computer readable storage medium as recited in claim 9, wherein when executed the program instructions are further operable to:
prior to sending the first data segment to a media server, encrypt the first data segment;
receive an encryption key at the media server; and
prior to generating a third fingerprint from the first data segment, decrypt the first data segment using the encryption key.

12. The computer readable storage medium as recited in claim 8, wherein the first fingerprint index is comprised of entries for fingerprints associated with data segments from only the first client, wherein the second fingerprint index is comprised of entries for fingerprints associated with data segments from only the second client, and wherein the common fingerprint index is comprised of entries for fingerprints associated with data segments from a plurality of clients, and wherein the plurality of clients includes the first and second clients.

13. A system for performing incremental backups of a data set, the system comprising:
a server; and
one or more storage devices coupled to the server;
wherein the server is configured to:
maintain a first fingerprint index configured to store fingerprints for data stored in a first client, a second fingerprint index configured to store fingerprints for data stored in a second client, and a common fingerprint index configured to store fingerprints for data stored in both the first client and the second client;
generate a first fingerprint for a first data segment from a first client;
query the first fingerprint index to determine if there is a matching fingerprint to the first fingerprint;
in response to determining the first fingerprint index does not contain a matching fingerprint to the first fingerprint:
create a new entry for the first fingerprint in the first fingerprint index;
store the first data segment in a container in a storage device;
query the second fingerprint index to determine if there is a matching fingerprint to the first fingerprint;
in response to determining the common fingerprint index does not contain a matching fingerprint to the first fingerprint, create a new entry for the first fingerprint in the common fingerprint index;
in response to determining the common fingerprint index contains a matching fingerprint to the first fingerprint:
store a reference to the matching fingerprint from the first fingerprint; and
delete the first data segment.

14. The system as recited in claim 13, wherein the server is further configured to:
- generate a second fingerprint for a second data segment from a second client;
- query the second fingerprint index to determine if there is a matching fingerprint to the second fingerprint;
- in response to determining the second fingerprint index does not contain a matching fingerprint to the second fingerprint:
  - create a new entry for the second fingerprint in the second fingerprint index;
  - store the second data segment in a container in a storage device;
  - query the common fingerprint index to determine if there is a matching fingerprint to the second fingerprint;
- in response to determining the common fingerprint index does not contain a matching fingerprint to the second fingerprint, create a new entry for the second fingerprint in the common fingerprint index;
- in response to determining the common fingerprint index contains a matching fingerprint to the second fingerprint:
  - store a reference to the matching fingerprint from the second fingerprint; and
  - delete the second data segment.

15. The system as recited in claim 13, wherein the common fingerprint index is queried to determine if there is a matching fingerprint to a second fingerprint, and wherein the second fingerprint is generated from the first data segment.

16. The system as recited in claim 15, wherein a fingerprint generation technique used for the first fingerprint index is different from a fingerprint generation technique used for the common fingerprint index.

17. The system as recited in claim 14, wherein the first fingerprint index is comprised of entries for fingerprints associated with data segments from only the first client, wherein the second fingerprint index is comprised of entries for fingerprints associated with data segments from only the second client, and wherein the common fingerprint index is comprised of entries for fingerprints associated with data segments from a plurality of clients, and wherein the plurality of clients includes the first and second clients.

* * * * *